United States Patent

Motooka et al.

[11] 4,120,393
[45] Oct. 17, 1978

[54] DEVICE OF CONTROLLING INTERVAL OF ARTICLES ON BELT CONVEYER

[75] Inventors: Akira Motooka, Kakogawa; Takeshi Yoshida, Tatsuno, both of Japan

[73] Assignee: Yamato Scale Co., Japan

[21] Appl. No.: 781,055

[22] Filed: Jan. 4, 1977

[30] Foreign Application Priority Data

Jan. 5, 1976 [JP] Japan .................................. 51-51340

[51] Int. Cl.² .......................................... B65G 47/29
[52] U.S. Cl. .................................... 198/460; 198/492
[58] Field of Search ............... 198/425, 444, 459, 460, 198/491, 492, 599, 634, 775, 781, 347

[56] References Cited

U.S. PATENT DOCUMENTS

| | | | |
|---|---|---|---|
| 1,900,150 | 3/1933 | Anderson | 198/459 |
| 2,549,341 | 4/1951 | Sperling | 198/492 |
| 2,801,725 | 8/1957 | Sindzinski et al. | 198/634 |
| 2,964,160 | 12/1960 | Powers | 198/491 |
| 3,162,294 | 12/1964 | Dieter | 198/460 |
| 3,231,062 | 1/1966 | Phillips, Jr. et al. | 198/492 |
| 3,263,794 | 8/1966 | Burton | 198/460 |
| 3,322,259 | 5/1967 | Milazzo | 198/460 |
| 3,355,008 | 11/1967 | Milazzo | 198/460 |
| 3,612,248 | 10/1971 | Wallis | 198/781 |
| 3,822,009 | 7/1974 | Richards | 198/444 |

FOREIGN PATENT DOCUMENTS 993,962   6/1965   United Kingdom ..................... 198/460

Primary Examiner—Evon C. Blunk
Assistant Examiner—Richard K. Thomson
Attorney, Agent, or Firm—Eugene E. Geoffrey, Jr.

[57] ABSTRACT

A device for controlling the interval between articles on a belt conveyer which includes forming the conveyer with a plurality of spaced belts, gates beneath the belts and movable upwardly between the belts and a control device for controlling the gates to regulate the intervals between articles carried by the conveyer. gates lift the articles from the belts and periodically redeposit them on the belts in response to a signal generator resulting in the release of uniformly spaced articles. The circuit further includes an article sensor for each gate and a further emergency sensor detecting an additional article when the system is already filled to capacity causing interruption of the motion of the belts.

1 Claim, 4 Drawing Figures

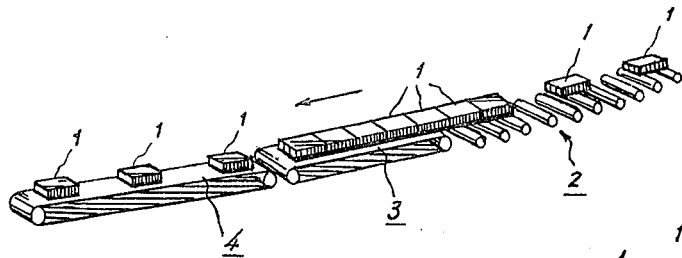
FIG. 1 (PRIOR ART)
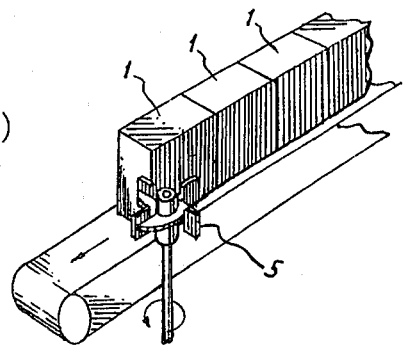
FIG. 4
FIG. 2 (PRIOR ART)
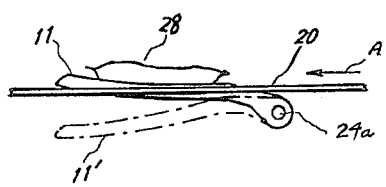
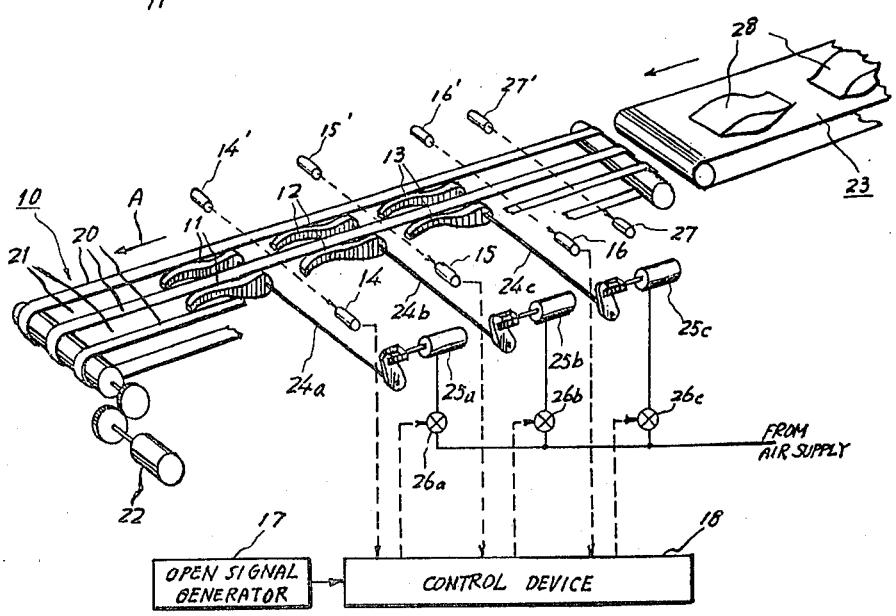
FIG. 3

DEVICE OF CONTROLLING INTERVAL OF ARTICLES ON BELT CONVEYER

This invention relates to a novel and improved device for automatically controlling the interval of articles which are successively loaded on and carried by a belt conveyer. The device of this invention is especially suitable for use when the articles are relatively soft and flexible as when they are packed in plastic, paper or metal foil bags.

There have been many kinds of devices proposed and used for controlling the interval of articles, which are loaded and carried on a belt conveyer, at a predetermined value for convenience of the succeeding process, as described later. However, the such prior art devices are unsuitable for soft or flexible articles such as foods packed in flexible bags since they may deform the articles to cause not only miscontrol of their interval but also accidental damage of the packages and the contents.

Accordingly, an object of this invention is to provide a novel and improved device which can automatically and correctly control the interval of the such soft and flexible articles on a belt conveyer at a predetermined or arbitrary value without encountering the above mentioned problems.

The device according to this invention comprises a belt conveyer including a plurality of conveying belts which are arranged in parallel with gaps therebetween to form a common carrying surface, a plurality of gate devices arranged at intervals along the longitudinal direction under said belts, each of said gate devices including a fork member movably supported under said belt and a fork driving unit for driving said fork member to let it protrude upwardly from said gaps to block passage of said articles in the "CLOSED" state of said gate device and be positioned under said belts to allow said passage in "OPEN" state thereof, a plurality of article detectors disposed respectively just before said gate devices for sensing said articles on said belts and producing a detection signal when the article is sensed, an opening signal generator for generating an opening signal which energizes the end most one of said gate devices to drive it into "OPEN" state, and a gate control unit for driving said endmost gate device into "CLOSED" state in response to said detection signal of the article detector disposed just before said endmost gate device and into "OPEN" state in response to said opening signal and driving the other gate devices into "CLOSED" state in response to the detection signals of the article detectors disposed respectively just before said other gate devices only when the gate devices which are disposed respectively next to said other gate devices are in "CLOSED" state.

Other object and features of this invention will be described in more detail hereinunder with reference to the accompanying drawings.

In the drawings:

FIGS. 1 and 2 are schematic perspective views representing two typical examples of the prior art devices for carrying out a similar function;

FIG. 3 is a partly broken-away perspective view representing an embodiment of the device according to this invention; and FIG. 4 is a partial side view presented as an aid for explanation of operation of the device of FIG. 3.

Throughout the drawings, like reference numerals are used to denote like structural components.

Referring to FIG. 1 showning a first example of prior art, articles 1 are fed onto a roller conveyer 2 at irregular intervals and then carried in the direction of the arrow by two belt conveyers 3 and 4. As the belt conveyer 3 is driven at a speed which is sufficiently lower than the running speed of the articles 1 on the roller conveyer 2, the articles 1 are put into contact with each other on the conveyer 3 as shown. Furthermore, the belt conveyer 4 is driven at a constant speed which is somewhat higher than that of the belt conveyer 3, so that specific intervals are provided between the articles 1 on the conveyer 4. It will be understood that the intervals are determined by the speed ratio of the both belt conveyers 3 and 4. On the other hand, in the device of FIG. 2, the articles 1 are once blocked by a vane wheel 5 and then released intermittently by intermittent rotation of the wheel 5, and controlled intervals are thereby produced. It can be understood, however, that these devices are unsuitable for flexible or easily deformable articles, though they may be suitable for hard articles having a fixed shape.

Referring next to FIG. 3, a belt conveyer 10 of this device includes three relatively narrow conveying belts 20 which are arranged in parallel with each other with gaps 21 therebetween and driven at a common speed by a motor 22 to a direction of arrow A. Preceding the belt conveyer 10, there is disposed a normal belt conveyer 23 which is driven at a belt speed somewhat higher than that of the conveyer 10. The conveyer 23 conveys articles 28 at irregular intervals and loads them successively onto the conveyer 10.

Under the conveying belts 20 of the conveyer 10, three fork members 11, 12, and 13 are disposed along the conveyer within the gaps 21 of the belts 20. The fork members 11, 12, and 13 are coupled through rotational shafts 24a, 24b and 24c to corresponding driving units including air cylinders 25a, 25b, and 25c which are respectively connected through control valves 26a, 26b, and 26c to a compressed air supply (not shown). Each fork member and its driving unit are arranged so that the form member moves upwards and protrudes from the belt surface as shown in solid line of 11 in FIG. 4 to shut off the article 28 to provide a "CLOSED" state when the corresponding driving unit is actuated but it falls under the belt surface as shown by dotted-line position 11' in FIG. 4 to release the article 28 onto the belt surface 20 to provide an "OPEN" state when the corresponding driving unit is deactuated.

Just before or upstream of the fork members 11, 12, and 13, there are disposed three photoelectric sensing units comprising photosensitive elements 14, 15 and 16 such as photocells and corresponding light sources 14', 15' and 16', respectively, for detecting the articles 28 on the conveyer 10.

An opening signal generator 17 is provided for producing a signal which is used for driving the endmost fork member 11 into "OPEN" state. More particularly, this signal is produced at constant intervals by means of a timer for example, then processed in a gate control device 18 and applied to the control valve 26a to deactuate the air-cylinder 25a, thereby lowering the fork member 11 under the belts 20.

The control device 18 is arranged to receive detection signals from the photosensitive elements 14, 15, and 16 and the opening signal from the generator 17 and control the air cylinders 25a, 25b, and 25c through the control valves 26a, 26b, and 26c to drive the fork members 11, 12 and 13 as follows. When a detection signal is received from the photosensitive element 14, the fork member 11 is driven into "CLOSED" state if no opening signal from the generator 17 to the control device 18 exists, but it is driven into "OPEN" state as soon as the opening signal is received in the control device 18. The fork member 12 is driven into "CLOSED" state if a detection signal is received from the photosensitive element 15 when the next fork member 11 is in "CLOSED" state. The fork member 13 is driven into "CLOSED" state as soon as a detection signal is received from the photosensitive element 16 only when the fork member 12 in the next stage is in "CLOSED" state. The fork members 12 and 13 are positioned in the "OPEN" state when they are not driven into the "CLOSED" state by the signals from the gate control device 18.

In operation, the articles 28 transferred from the belt conveyer 23 to the conveyer 10 are temporarily caught by the endmost fork member 11 and then sent out every time the fork member 11 is driven into "OPEN" state by the opening signal produced at constant intervals from the generator 17. Accordingly, the articles are released from the conveyor 10 at constant intervals. When the fork members 11 is catching an article, the fork member 12 is driven into the "CLOSED" state to catch the following article, thereby preventing congestion of the articles. When the fork member 11 is driven into the "OPEN" state to release the article, the fork member 12 is also driven into the "OPEN" state to release the following article. The fork member 13 operates in similar fashion to the fork member 12 in cooperation with the fork member 12 to prevent congestion of the articles on the fork member 12.

Another photoelectric sensing unit comprising a photosensitive element 27 and a light source 27' is also provided before the sensing unit 16. The detection signal of the element 27 is also supplied to the control device 18 although the connection is omitted in the drawing for simplification. The control device 18 is also arranged to produce an alarm signal when the detection signal is received from the photosensitive element 27 during the "CLOSED" state of the fork member 13. The alarm signal is applied to an alarm device and a control board to give an alarm and stop the conveyers, thereby overcoming the over-loaded state of the device.

It should be noted that the above description has been made with reference to a specific embodiment of the invention for explanation purposes only and various modifications and changes can be made without leaving the scope of this invention as defined in the appended claims.

For example, referring to the composition including a fork member and corresponding fork driving unit and photosensing unit as a gate device, the number of gate devices may be increased beyond three. With an increase of this number, the capacity of the conveyer 10 for absorbing variations of the intervals of articles fed to this conveyer is increased. For this purpose, the speed of the conveyer belt 23 may be reduced in response to the alarm signal instead of stopping the conveyers as above mentioned.

Moreover, though the opening signal generator 17 has been described to produce an opening signal at equal intervals for maintaining the interval of the articles 28 constant, variable intervals may be given in accordance with a predetermined schedule or as occasion demands. For example, in order to meet with the operation of the processing device in the succeeding stage, the opening signal generator 17 may be interlocked with said operation for producing the opening signal in response to demand of an article of the succeeding stage.

What is claimed is:

1. A device for controlling the interval of articles fed by a belt conveyer, comprising a belt conveyer including a plurality of conveying belts which are arranged in parallel with lateral gaps therebetween to form a common carrying surface, a plurality of gate devices arranged at intervals along the longitudinal direction under said belts, each of said gate devices including a fork member movably supported under said belts and a fork driving unit for driving said fork member to a position protruding upwardly from said gaps to block passage of said articles by lifting them from the carrying surface in the "CLOSED" state of said gate device and to a position beneath said belts to allow said passage in "OPEN" state thereof, a plurality of article detectors disposed respectively just before said gate devices for sensing said articles on said belts and producing a detection signal when the article is sensed, an opening signal generator for generating a series of opening signals at predetermined intervals, a gate control device for driving the endmost one of said gate devices into the "CLOSED" state in response to the detection signals of the article detector disposed respectively just before said endmost gate device and into "OPEN" state in response to said opening signal and driving the other gate devices into "CLOSED" state in response to the detection signals of the article detectors disposed respectively just before said other gate devices only when the gate immediately downstream is in "CLOSED" state, and an emergency detector disposed before the article detector of the first gate device for interrupting the motion of the belt conveyer when it senses an article and said first gate is in the "CLOSED" position.

* * * * *